(12) United States Patent
Uskoski

(10) Patent No.: US 10,875,753 B2
(45) Date of Patent: Dec. 29, 2020

(54) TELEHANDLER BOOM EXTENSION MONITORING SYSTEM

(71) Applicant: Manitou Equipment America, LLC, West Bend, WI (US)

(72) Inventor: William Uskoski, Hayti, SD (US)

(73) Assignee: Manitou Equipment America, LLC, West Bend, WI (US)

( * ) Notice: Subject to any disclaimer, the term of this patent is extended or adjusted under 35 U.S.C. 154(b) by 280 days.

(21) Appl. No.: 16/137,096

(22) Filed: Sep. 20, 2018

(65) Prior Publication Data
US 2020/0095102 A1    Mar. 26, 2020

(51) Int. Cl.
  *B66F 9/075*   (2006.01)
  *B66C 13/48*   (2006.01)
  *G01B 7/04*    (2006.01)
  *B66F 9/065*   (2006.01)
  *B66C 23/90*   (2006.01)

(52) U.S. Cl.
  CPC ............ *B66F 9/0755* (2013.01); *B66C 13/48* (2013.01); *B66F 9/0655* (2013.01); *G01B 7/04* (2013.01); *G01B 7/042* (2013.01); *B66C 23/905* (2013.01)

(58) Field of Classification Search
  CPC ......... B66F 9/0755; B66F 13/46; G01B 7/042
  USPC .................................... 33/706–708; 340/685
  See application file for complete search history.

(56) References Cited

U.S. PATENT DOCUMENTS

| | | | |
|---|---|---|---|
| 3,740,534 A | 6/1973 | Kezer et al. | |
| 4,185,280 A | 1/1980 | Wilhelm | |
| 4,216,868 A * | 8/1980 | Geppert | B66C 23/905 212/278 |
| 4,456,093 A * | 6/1984 | Finley | B66F 17/006 182/18 |
| 4,654,527 A * | 3/1987 | Schmitt | H03M 1/308 250/237 G |

(Continued)

FOREIGN PATENT DOCUMENTS

| | | |
|---|---|---|
| CN | 103754768 | 4/2014 |
| EP | 0591550 | 4/1994 |
| JP | 2002211879 | 7/2002 |

OTHER PUBLICATIONS

Pepperl+Fuchs, "Inductive positioning system," Product information, issued Jun. 11, 2013, accessed on internet on Sep. 19, 2018, [https://files.pepperl-fuchs.com/webcat/navi/productInfo/edb/191136_eng.pdf?v=20180423144524], 3 pages.

(Continued)

*Primary Examiner* — Christopher W Fulton
(74) *Attorney, Agent, or Firm* — Reinhart Boerner Van Deuren s.c.

(57) ABSTRACT

A boom extension monitoring system is provided that uses a combination of sensors to determine an absolute location and a relative location of the boom. As the boom extends or retracts, the monitoring system can determine the absolute location of the boom as the sum of the absolute at relative distances. These distances can be obtained through a combination of a grid, low-resolution sensors, high-resolution sensors, counters, processors, and other components according to various embodiments described herein. A process to obtain the total boom extension of multiple telescoping beams by monitoring the extension of a single beam element is also described.

27 Claims, 7 Drawing Sheets

(56) References Cited

U.S. PATENT DOCUMENTS

| | | | | |
|---|---|---|---|---|
| 5,138,560 | A | * | 8/1992 | Lanfer ................ G01D 5/2495 235/454 |
| 5,160,055 | A | | 11/1992 | Gray |
| 5,225,830 | A | * | 7/1993 | Andermo ............ G01D 5/2415 33/706 |
| 5,333,390 | A | * | 8/1994 | Petterson ................ G01B 7/02 33/706 |
| 5,793,201 | A | * | 8/1998 | Nelle ...................... G01B 7/02 324/207.14 |
| 5,823,369 | A | | 10/1998 | Kuromoto |
| 5,877,693 | A | | 3/1999 | Eyler |
| 6,496,766 | B1 | | 12/2002 | Bernold et al. |
| 7,665,620 | B2 | | 2/2010 | Morath |
| 7,770,304 | B2 | * | 8/2010 | Oberhauser ........ G01D 5/34792 33/707 |
| 7,856,282 | B2 | | 12/2010 | Tabor |
| 8,477,027 | B2 | | 7/2013 | Givens et al. |
| 8,720,709 | B2 | | 5/2014 | Willim |
| 8,843,279 | B2 | | 9/2014 | Tafazoli Bilandi et al. |
| 8,881,919 | B2 | | 11/2014 | Benton et al. |
| 8,918,246 | B2 | | 12/2014 | Friend |
| 9,886,803 | B2 | | 2/2018 | Oswald et al. |
| 10,006,821 | B1 | * | 6/2018 | Boger .................... G01B 11/16 |
| 10,208,772 | B1 | * | 2/2019 | Beck ...................... G01D 5/48 |
| 2005/0060905 | A1 | * | 3/2005 | Novak ................ G01D 5/2495 33/706 |
| 2005/0072016 | A1 | * | 4/2005 | Strasser .............. G01D 5/2497 33/706 |
| 2007/0089925 | A1 | * | 4/2007 | Addleman ............... B66D 1/46 180/313 |
| 2012/0285031 | A1 | | 11/2012 | Robert et al. |
| 2018/0105402 | A1 | | 4/2018 | Wimmer et al. |

OTHER PUBLICATIONS

Xometry, "Metal 3D Printing," accessed on Sep. 19, 2018, [https://www.xometry.com/metal-3d-printing?ads_cmpid=713330591&ads_adid=35916265], 2 pages.

European Patent Office, "Extended European Search Report," issued in connection with European Patent Application No. 19197405.4, dated Jun. 5, 2020, 6 pages.

* cited by examiner

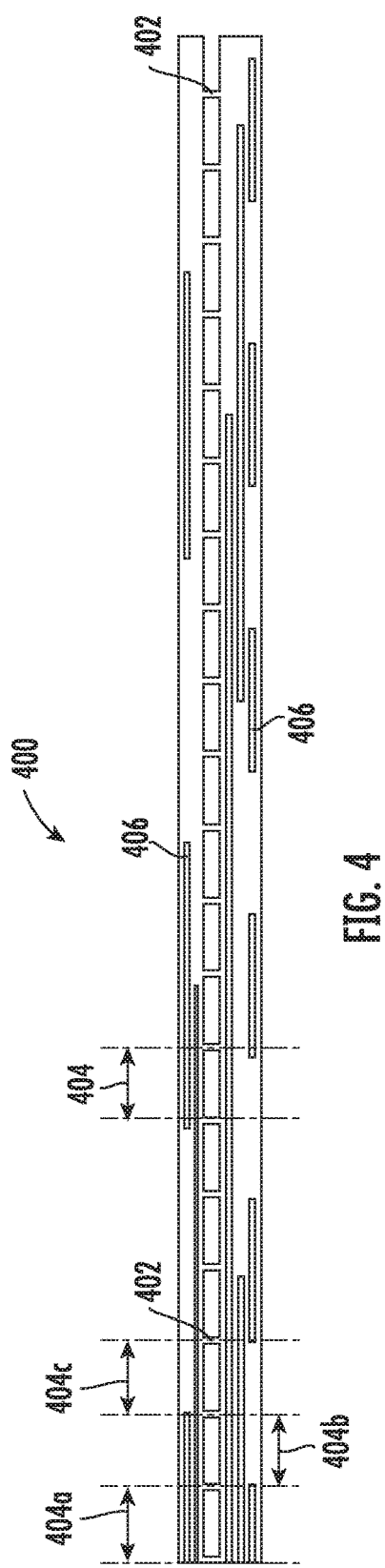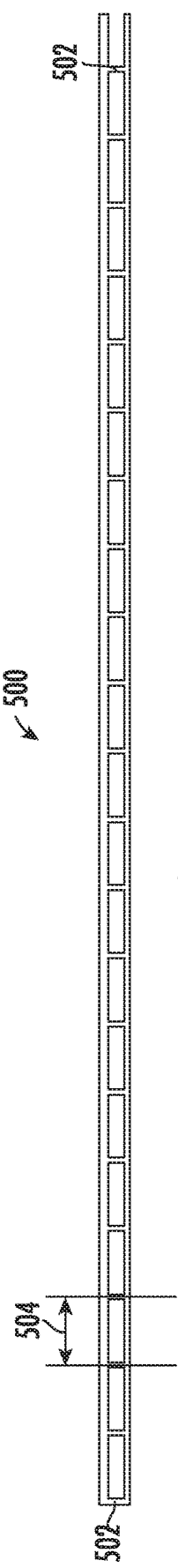

TELEHANDLER BOOM EXTENSION MONITORING SYSTEM

BACKGROUND OF THE INVENTION

The present invention relates generally to the field of cranes and telehandlers. The present invention relates specifically to a system that monitors the extension of a telehandler boom. Monitoring the extension of a telehandler boom ensures that the boom can support the load as the boom extends, often increasing the reactive moment that supports the load.

Operators employ many types of heavy equipment (loaders, skid steers, boom handlers, etc.) in a wide variety of tasks including farming and construction. Many such vehicles operate a boom extender, for example, employing hydraulic actuators to extend a beam from a boom handler. In a vehicle with lift arms, a stationary beam supports one or more movable beams as they extend along a longitudinal axis of the boom.

SUMMARY OF THE INVENTION

One embodiment of the invention relates to a boom extension monitoring system. The boom extension monitoring system includes a rotatable beam, a movable beam slidably supported to move along a longitudinal axis relative to the rotatable beam, and an actuator coupled between the rotatable beam and the movable beam. A metallic grid forms a sequence of equally-spaced formations along either the rotatable beam or the movable beam. Each formation is spaced from an adjacent formation by a predetermined distance. The metallic grid includes target formations that indicate the beginning and end of each range. The metallic grid pattern further includes a binary number pattern. A low-resolution sensor coupled to either the rotatable beam or the movable beam determines a binary number associated with the binary number pattern on the metallic grid. The binary number indicates an absolute location of each range. A high-resolution sensor coupled to either the rotatable beam or the movable beam determines the relative distance of the beam extension over the range as a distance from the adjacent target formation. The physical extension of the movable beam is the sum of the absolute location plus the relative distance from the target formation.

Another embodiment of the invention relates to a boom extension monitoring system, including a rotatable beam and a movable beam. The movable beam is slidably supported to move relative to the rotatable beam. The movable beam is divided into a series of equidistant ranges, each range comprising a target formation and a range distance. A grid formation coupled to either the rotatable beam or the movable beam forms target formations for each range. A counter is configured to count a number of target formations during extension of the movable beam. A high resolution sensor is configured to determine a distance from an adjacent target formation as the movable beam extends over the range. Non-volatile memory stores the number of counted target formations and the range distance. A processor calculates a total beam extension as a function of the number of target formations multiplied by the range distance plus the distance from the adjacent target formation, as measured by the high resolution sensor.

Another embodiment of the invention relates to a boom extension monitoring system that includes a rotatable beam, a movable beam, a ferrous paint formation, a counter, a high resolution sensor and a processor. The movable beam is slidably supported to move along a longitudinal axis of the rotatable beam. The ferrous paint formation is disposed on the rotatable beam or the movable beam. The ferrous paint formation forms a series of equally spaced ranges, each range comprising a target formation. The counter counts the number of target formations corresponding to each range during extension of the movable beam and computes an absolute location. The high-resolution sensor determines a relative distance from the adjacent target formation as the beam extends over each range. The processor determines the total beam extension as a function of the absolute location, as determined by the counter, plus the relative distance, as measured by the high-resolution sensor.

Another embodiment of the invention relates to a boom length monitoring system for a telescoping boom having at least a pivoting beam section pivotable at a first end and a first telescoping beam section which telescopes relative to and along the longitudinal axis of the pivoting beam section. The telescoping beam includes a first terminal end opposite the first end. A metallic grid is applied to one of the pivoting and telescoping beam sections. The grid includes a plurality of unique, equally spaced formations and a pattern of spaced formations which identify the unique location of each equally spaced formation. A low-resolution sensor array is applied to the other of the pivoting and telescoping beam sections. The low-resolution sensor array interacts with the spaced formations to generate a first signal representative of each of the spaced formations. A high-resolution sensor is applied to the other of the pivoting and telescoping beam sections to generate a second signal representative of a location within a spaced formation. A monitoring circuit couples to the sensors to generate a displacement signal representative of a location of the telescoping beam section relative to the pivoting beam section.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 4 is a detailed view of a metallic grid, according to one embodiment.

FIG. 5 is a detailed view of a repeating grid, according to one embodiment.

DETAILED DESCRIPTION

Figure 1:
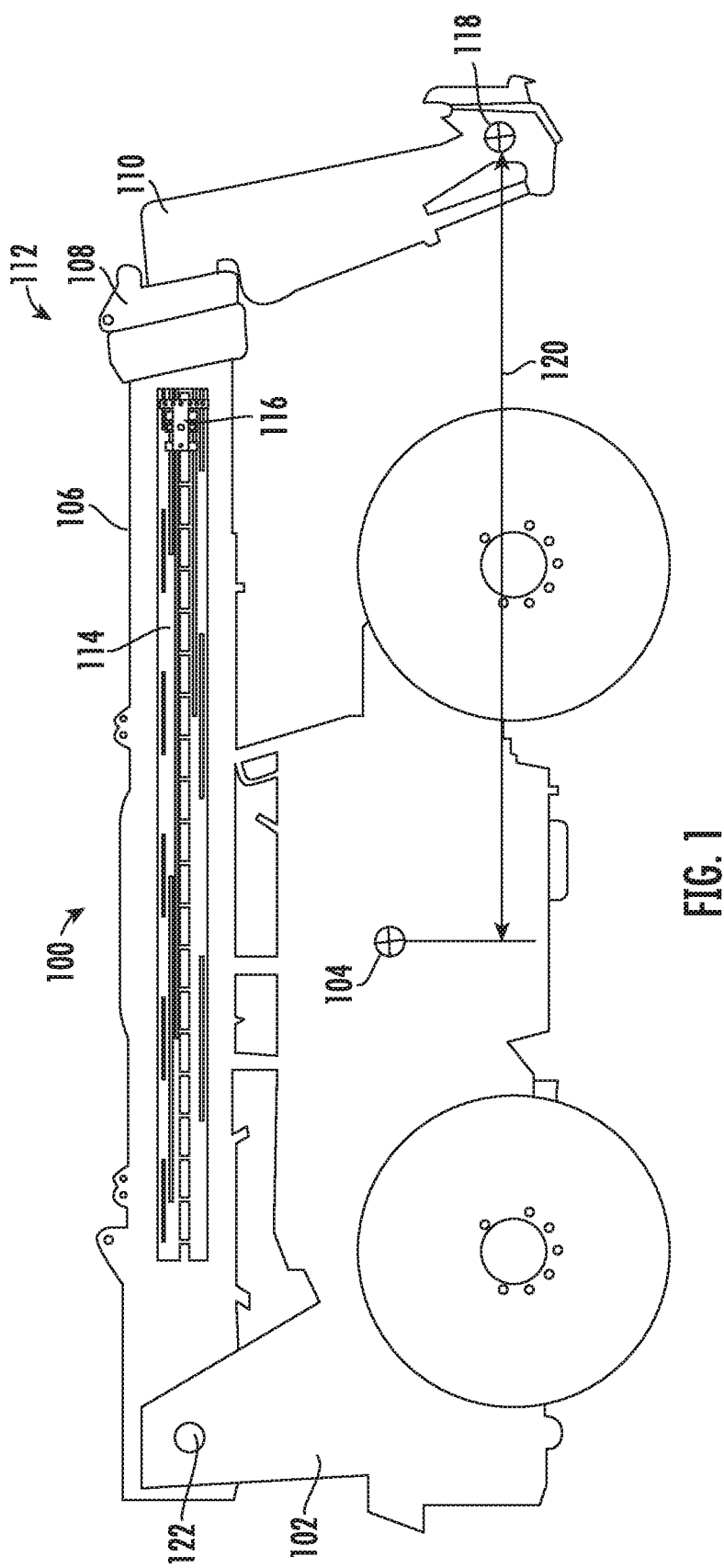
FIG. 1 illustrates a telehandler boom with a system for monitoring the boom extension, according to an exemplary embodiment.

Referring generally to the figures, various embodiments of systems to monitor a telehandler boom extension are shown. Although generally referred to as a telehandler boom in this application, it is understood that a boom in this description includes several different machines such as telescopic handlers, telehandlers, teleporters, boom lifts, forklifts, telescopic cylinders, cranes, articulating booms, reach stacker, jibs, trusses, cherry pickers, and/or any machine capable of telescopic articulation. Telehandler machines can use outriggers or stabilizers that extend from the stationary equipment and increase the lifting capability of the telehandler. Rotary joints installed between the beams (e.g., the first or last beam) may enable a mobile crane to rotate at the terminus. This configuration is commonly referred to as a "roto" machine or "roto" telehandler boom. These roto-telehandlers are a hybrid combination of a telehandler and a small rotatable crane.

Telehandler boom extensions can include one or more beams concentrically located around each other such that the beams telescope along their longitudinal axis. The use of multiple concentric beams enables increased total extension of the boom because each beam extends an equal distance along the longitudinal axis. Many boom extenders deploy multiple beams at equal rates along the longitudinal axis thereby increasing the total extension of the boom telehandler. The ability to monitor a first movable beam thus enables a monitoring system to calculate the total extension of the telehandler, since each beam is equally extended. Thus, the total extension is merely a product of the measured distance of a first extended beam times the number of beams extended.

Telehandler booms enhance the ability to access distant components (e.g., loads). This ability also presents a limitation. An extended boom bearing a load may create a significant moment (force times distance). The telehandler may use counterweight to support the moment, but an increased extension of the boom may limit the load the boom can support. This lever action can cause the telehandler to become unstable. Telehandlers generally employ counterweights (e.g., in the rear of the telehandler) to stabilize the boom as it extends.

Nevertheless, the lifting capacity of the telehandler decreases as the inverse product of the working radius. The working radius is the distance from the center of gravity (CG) of the load to the CG of the telehandler boom. As the working radius increases, the ability of the telehandler to support the load rapidly decreases. Therefore, the extension of the telehandler is a critical component that benefits from careful monitoring during operation. In addition to the boom extension, the weight, angle, and height of the telehandler may also affect the load the telehandler may safely transport. Therefore, it is desirable for the telehandler to accurately measure the extended distance of the boom to inform the operator of safe operation and/or to utilize a computer with sensors to monitor the extension. For example, a computer can warn the operator and/or turn off operation of the telehandler if the boom extension exceeds a safe operation working radius.

FIG. 1 illustrates a system 100 for monitoring the extension of a telehandler boom vehicle 102. The system 100 includes a telehandler boom vehicle 102 (e.g., generally referred to as "telehandler 102"). Telehandler 102 includes a center of gravity (CG) 104 and a stationary but rotatable first beam 106. For example, beam 106 can rotate about pivot 122. Telehandler 102 includes a second beam 108 concentrically located within the first beam 106, and a third beam 110 located within the first beam 106 and second beam 108. When the telehandler boom 112 is fully retracted, only the ends of the second beam 108 and third beam 110 are visible. The boom 112 includes the combination of first beam 106, second beam 108, and third beam 110. An actuating arrangement may couple the first beam 106 to the pivoting boom section to rotate the beam 106 about pivot 122. Actuators may uniformly extend the second beam 108 and third beam 110 in telescoping boom sections to uniformly extend the slidably supported beam sections relative to each other. For example, an actuator can be coupled between the rotatable beam 106 and the movable beam 108 slidably supported by the rotatable beam 106 to move along a longitudinal axis relative to the rotatable beam 106.

Boom 112 is telescopic because it includes multiple concentrically located beams within the boom. Telehandler boom 112 is fully extended when each beam is located at its maximum extension relative to the other beams. Each beam can partially extend/retract, or fully extend/retract, as long as each concentric beam is equally extended. As shown in FIG. 1, the beams 108 and 110 are fully retracted.

In a preferred embodiment, the telehandler boom 112 may include a grid 114. Grid 114 may include any material that serves as a target formation 214 for measurement by one or more sensors attached to sensory component 116. Target formation 214 indicates the beginning of each range and provides a means for measurement for the sensor (e.g., a sensor attached to sensory component 116). The grid 114 may be a sheet of metal cut to form target formation and range formations. The edges of the target formation and/or range formations can include heat affected surfaces, e.g., as generated by a laser cutter. The metal grid 114 may include raised metal portions formed on the surface of one of the pivoting or telescoping beam sections. Grid 114 can be fastened to either one of the pivoting or telescoping beam sections.

Grid 114 can be optical and include a reflective element for a camera or laser. The grid 114 may be a metallic grid 114 that is attached to one or more beams, or it may be a non-metallic grid 114. Grid 114 can be a ferrous or nonferrous painted grid 114 for use with an inductive sensor 212. For example, grid 114 may include a ferrous sheet that is laser cut and welded to a side of a beam 106, 108, and/or 110. Grid 114 can be printed using a 3D printer and attached, printed, and/or painted onto a component of the telehandler boom 112. The metallic grid can be soldered, formed, glued, welded, or otherwise affixed to the beam. Alternatively, paint layers may include a ferrous component to construct a ferrous grid 114 within the paint. As described herein, an inductive sensor 212 determines a distance from a ferrous grid 114, but other methods of creating a grid 114 with an associated sensor.

A sensory component 116 can attach to the movable beam (e.g., beam 108) or the stationary and/or rotatable beam (e.g., beam 106) opposite the placement of the grid 114. Sensory component 116 may include one or more sensors in a cluster that traverse over grid 114 as the boom is extended or retracted. Sensory component 116 may include both high-resolution and/or low-resolution sensors. For example, a sensory component 116 including several low-resolution sensors can determine a binary number associated with the number of extended ranges. The high-resolution sensor can sense the amount of movement over a range from a target formation location.

For example, the absolute extension over a number of target formations is the length of each target formation over the grid 114 times the number of target formations. The absolute extension has a low resolution, equal to the size of a range. Therefore, the absolute extension does not change until the low-resolution sensor passes over another target formation (e.g., enters a new range). A high-resolution sensor can determine the distance from a target formation within the range with much higher resolution and accuracy. The high-resolution sensor may not be capable of large measurements, but can repeatedly make accurate measurements from a target formation. To obtain better resolution of the extension of the boom, a processor combines the low-resolution "absolute distance" with the high-resolution "relative distance." The relative distance includes any distance extended in the range and between the target formations. Therefore, the total extension is the absolute distance, determined by the low-resolution sensors, plus the relative distance, determined by the high-resolution sensor.

Figure 2:
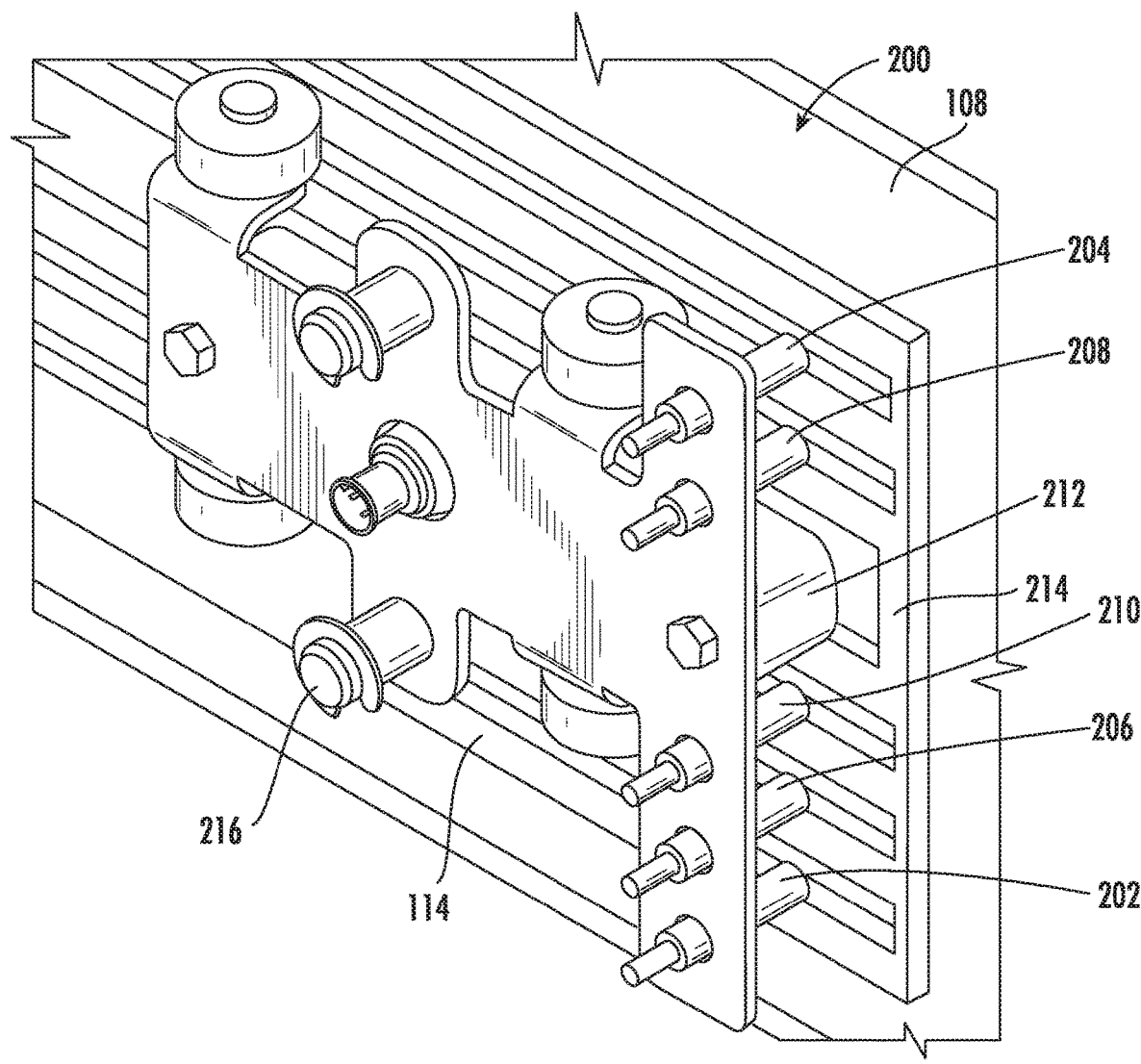
FIG. 2 is a detailed view of the monitoring system of the extension of a telehandler boom, including a series of low-resolution sensors, a high-resolution sensor, and a grid pattern.

FIG. 2 illustrates a detailed view of sensory component 200, which may be the same as or similar to sensory component 116, illustrated and described in FIG. 1. In a preferred embodiment, sensory component 200 includes a series of low-resolution sensors to determine the binary code associated with the absolute location of the sensor. Low-resolution sensors include sensors 202, 204, 206, 208, and 210. Sensory component 200 also includes a high-resolution sensor 212 to determine the relative distance of the sensor 212 to the last (e.g., nearest) target formation 214 on the grid 114.

A series of low-resolutions sensors 202, 204, 206, 208, and 210, can encode in binary format the number of extended ranges. Sensory component 200 may maximize the separation of a first low-resolution sensor 202 from a second low-resolution sensor 204. The sensory component 200 may similarly separate the second low-resolution sensor 204 from a third low-resolution sensor 206, and the third low-resolution sensor 206 from a fourth low-resolution sensor 208, which is separated from fifth low-resolution sensor 210. This configuration maximizes the separation between the low-resolutions sensors and ensures that the signal from each low-resolution sensor does not adversely affect the signal at adjacent locations (e.g., heat or other interference). Although the system may use a binary counter for each target formation 214 location on the grid 114, the binary counter may include a Gray code, so that only one bit is changed per target formation 214 area and further minimizing interference from adjacent low-resolution sensors. Thus, the low-resolution sensors are a binary (on/off) sensor arranged in a configuration that ensures an accurate absolute distance measurement that is updated at each target formation 214.

A high-resolution sensor 212 may measure the relative distance of the sensory component 200 from a target formation 214 on grid 114. Grid 114 may include a series of repeatable target formations 214 equidistant from each other that define ranges (e.g., the distance from one target to another is one range). The high-resolution sensor 212 indicates the extended distance from the nearest target formation 214. Thus, the total extension is the sum of the absolute distance encoded in the binary number obtained from the low-resolution sensors added to the relative distance measured by the high-resolution sensor 212.

Referring to FIGS. 1 and 2, a boom length monitoring system 100 for a telescoping boom 112 may have a first beam 106 rotatable about a pivot 122 (beam 106 rotates about pivot 122). The pivoting beam 106 may rotate about pivot 122 at a first end of beam 106 and include a first telescoping beam section (e.g., at the other end of beam 106). The telescoping boom 112 section of beams 106 and beam 108 can telescope relative to and along the longitudinal axis of first beam 106. The telescoping boom 112 includes a rotatable beam 106 with a first terminal end near beam 108. The telescoping section of boom 112 may be opposite the pivot 122.

In some embodiments, sensory component 200 connects to rotatable beam 106 through one or more connectors 216, and the metallic grid 114 connects to the movable beam 108. In some embodiments, connectors 216 connect to the movable beam 108, and the grid 114 connects to the rotatable beam 106. Referring back to FIG. 1, as the second movable beam 108 extends, third movable beam 110 extends the same distance. Thus the total extended distance (absolute distance plus relative distance) calculated by sensory component 200 is doubled to determine the total extension of boom 112. Similar products result when the boom includes a third or a fourth concentric beam. Thus, a measurement of a first extended beam can determine the total extension of the boom, as the distance measured by the first beam and multiplied by the number of equally extended beams.

Figure 3A:
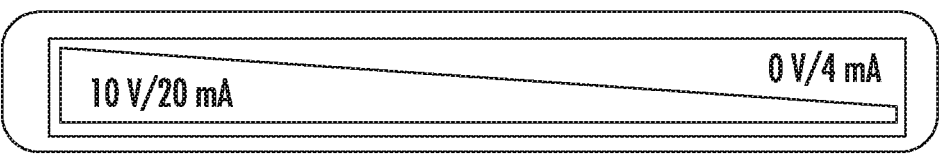
FIG. 3A is a top view of a high-resolution inductive sensor, according to one embodiment.

FIG. 3 illustrates a detailed view of one embodiment of a high-resolution inductance sensor 300. The bottom view, shown in FIG. 3A illustrates the inductance measurement of 10 V/20 mA at or near the target formation 214 location dropping to a signal of 0 V/4 mA at the maximum measurable distance to the target formation 214. Referring to FIGS. 1-3, for example, assume the maximum measurable distance is 120 mm. Since the high-resolution inductance sensor 300 can only sense a relative measurement of 120 mm, the target formation 214 repeats on the metallic grid 114 every 120 mm. Pepperl-Fuchs manufactures an inductive positioning system that uses the inductive voltage or current from a ferrous target formation 214 and determines a distance from the ferrous target formation 214. Pepperl-Fuchs model number PMI120-F90-IU-V1 has a measurement range of zero to 120 mm and has an accuracy of ±0.1 mm. Similar sensors, inductive or otherwise, may have different ranges and/or accuracies and may be used as described herein.

When five bits encode the low-resolution sensors, and a high-resolution inductive positioning sensor is used with a repeating target formation 214 every 120 mm, the system can sense an extension range from zero to 3,840 mm ($2^5$ bits×120 mm) with accuracy to ±0.1 mm. In other words, the system can detect the extension of boom 112 from 0 m to 3.84 m (12.6') with ±0.1 mm accuracy. System 100 can add additional beams and detect total boom 112 extensions for a first additional beam from 0 m to 7.68 m (25.2') with ±0.2 mm accuracy. With a third beam, system 100 can detect boom 112 extensions from 0 m to 11.52 m (37.8'). System 100 can detect boom 112 extensions of a fourth beam from 0 m to 15.36 m (50.4'). In all these configurations, the system 100 only makes one measurement of the first movable beam, and the accuracy of the measured extension remains less than ±0.4 mm (e.g., for four extended beams).

Figure 3B:
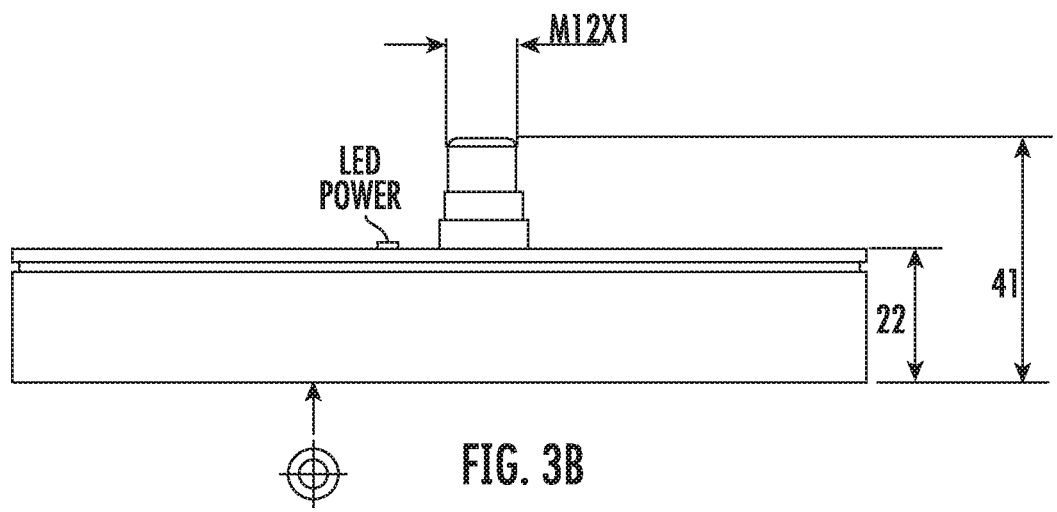
FIG. 3B is a side view of a high-resolution inductive sensor, according to one embodiment.
Figure 3C:
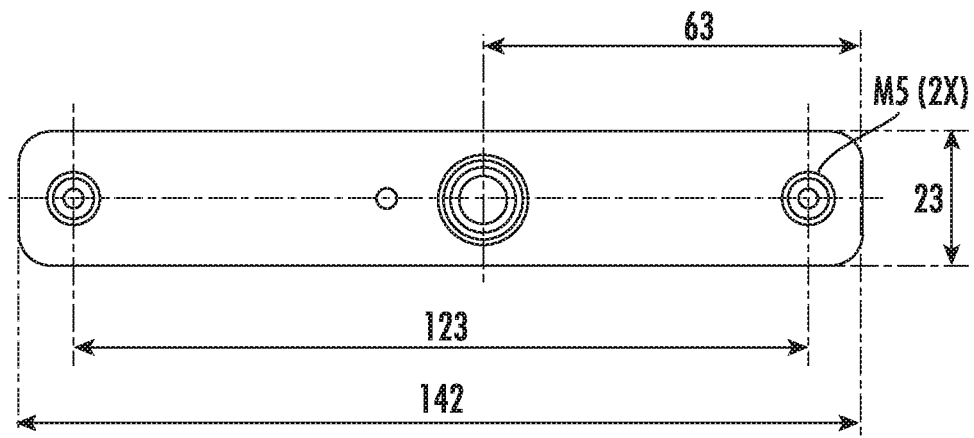
FIG. 3C is a bottom view of a high-resolution inductive sensor, according to one embodiment.

FIG. 3B illustrates a side view of the high-resolution inductive sensor 300. The high-resolution inductive sensor 300 includes an electric connection to communicate relative distance (as a scaled voltage) in real-time. The sensor dimensions are shown in mm, demonstrating that the sensor may fit along concentric beams (e.g., first beam 106 and second beam 108) of a telehandler boom 112. FIG. 3C illustrates a top view of the electric connector and includes two access points to attach the high-resolution inductive sensor 300 to sensory component 116. Other inductive sensors may be used to determine the distance from a target formation 214 location.

Referring to FIGS. 1-3, a high-resolution sensor 212 (e.g., an inductive sensor 300) may have a range of 1 cm, 2 cm, 3 cm, 4 cm, 5 cm, 6 cm, 7 cm, 8 cm, 9 cm, 10 cm, 11 cm, 12 cm (120 mm), 13 cm, 14 cm, 15 cm, 16 cm, 17 cm, 18 cm, 19 cm, or 20 cm. The grid 114 may have target formations 214 that are equally spaced to the sensor's range. The measurement range of the high-resolution sensor 212 may determine the grid 114 pattern. Specifically, the range of the grid pattern should not exceed the measurement range of the high-resolution sensor 212 (e.g., inductive sensor 300). The grid 114 target formations 214 should repeat at the measurement range of the selected inductive sensor. The selection of sensors is limited only by the desired accuracy and target formation 214 distance on the metallic grid 114.

FIG. 4 illustrates a metallic grid pattern 400 according to a preferred embodiment. The metallic grid 400 may be cut and welded onto the movable beam or the stationary beam. Such a cut and welded metallic grid 400 may include a binary number pattern indicating to the low-resolution sensor the number of extended ranges. In various embodiments, the metallic grid can be 1 mm, 2 mm, 3 mm, 4 mm, 5 mm, 6 mm, 7 mm, 8 mm, 9 mm, or 10 mm thick.

Referring to FIG. 4, the metallic grid 400 is arranged to have a series of repeatable target formations 402 indicating a number of repeatable ranges 404. Each range 404 has a target formation location 402 that enables the high-resolution sensor (e.g., sensor 212) to track a relative distance of the sensor 212 as it travels along the range 404. For example, an inductive measurement of the sensor 212 from target formation 402 may give an accurate measurement of the distance the sensor 212 has moved over that range 404. Using a series of repeatable target formations 402 and ranges 404 enhances the accuracy of the system since the sensor 212 is measuring a relative distance to the nearest target formation 402. In the embodiment shown in FIG. 4, each range 404 has a repeatable target formation 402 and distance across the range 404 To determine the total extension of the boom, the metallic grid 400 indicates an absolute measurement that includes the number of ranges 404 traversed and the distance of each range 404. A processor adds the absolute distance indicated by the metallic grid 400 to the relative distance computed from the high-resolution sensor 212.

A low-resolution sensor may determine a number associated with the binary number pattern. The binary number indicates an absolute location of each range, based on the number of extended target formations. The low-resolution sensor array may interact with the spaced binary formations to generate a binary signal representative of each of the spaced formations.

The range includes a series of binary codes 406 collectively assigning a unique binary number to the range 404. Range 404a shows a binary code of 00000, because the binary codes 406 are all empty. In contrast, range 404b shows a different binary code that similarly differs from range 404c. As illustrated in FIG. 4, the binary code 406 may be a Gray code which enables the system to detect only one change at each range and indicate a new unique binary number. The Gray code pattern allows the grid 400 to encode a binary number (e.g., 00000, 00001, 00010, 00011, etc.), while only changing one value at each range 404. For example in Boolean binary, the number seven encodes as 00111, and the number eight encodes as 01000. Thus, changing from range seven to range eight would require a Boolean binary system to change four bits.

Given the limitations of mechanical tolerances, a system that accurately senses the change in all four bits at the same time may become costly. Therefore, a Gray code is used to translate the binary bits of the grey scale binary code 406 into a single changed bit per range 404. Then the Gray code is translated to a binary number that represents the absolute number of traversed ranges 404. Thus, the binary number represents the extended distance of the beam up to the last target formation 402. The binary pattern 406 determines the absolute distance (e.g., Boolean, Gray code, or other binary code) as the number of ranges times the distance of each range.

A high-resolution sensor may determine the relative distance of the beam extension over the range as a distance from the adjacent (e.g., nearest) target formation. The high-resolution sensor generates a second signal in addition to the binary code received by the low-resolution sensor. The second signal received by the high-resolution sensor is representative of a location within a spaced formation (e.g., a range or a distance from a target formation). The relative distance of the extension from the target formation 402 is determined by high-resolution sensor 212 and measures the extension over the range 404 from the target formation 402.

For example, as the sensor 212 traverses over range 404a, the encoded binary pattern 406 shows an absolute distance of zero, but the relative distance sensed by the sensor may vary from zero to the maximum distance of the range (e.g., 120 mm). At that point, a new target formation 402 and range (e.g., range 404b) begin and the binary pattern 406 changes to encode an absolute distance equal to one range. As the sensor moves over range 404b, the absolute distance of one range remains constant, but the relative range sensed by sensor 212 changes from zero to the maximum distance of range 404. Again, when the sensor enters the third range 404c, the absolute distance changes to two ranges 404 and the relative distance varies from zero to a complete range 404 as sensed by the high-resolution sensor 212. In this way, the total extension of the boom is the sum of the relative distance determined by the distance of the sensor 212 from the target formation 402 plus the absolute distance encoded in the binary pattern 406. A high-resolution inductive sensor may have a range of 120 mm and receive a scaled voltage that determines a distance to a ferrous metallic target formation within the 120 mm range to an accuracy within ±0.1 mm.

High-resolution sensors can include an eddy current inductive sensor, an LVDT voltage inductive sensor, a capacitive displacement sensor, a laser sensor, a confocal sensor, an acoustic sensor, and/or a magneto-inductive sensor. In some embodiments, the high-resolution sensor has a range of at least 8 cm and/or an accuracy of at least ±0.05 mm. In some embodiments, the sensor has a measurement range of at least 10 cm and an accuracy of at least ±0.08 mm.

The process described above applies to a single beam extension. If multiple beams all move equidistant to one another, the total extension of the boom is the sum of the relative distance and the absolute encoded distance, multiplied by the number of extended beams. Thus, the binary code 406 and measured distance from target formation 402 over range 404 enables the determination of the extension of a single beam and the calculation of the extension of several beams as a product of the extension times the number of beams.

Figure 6:
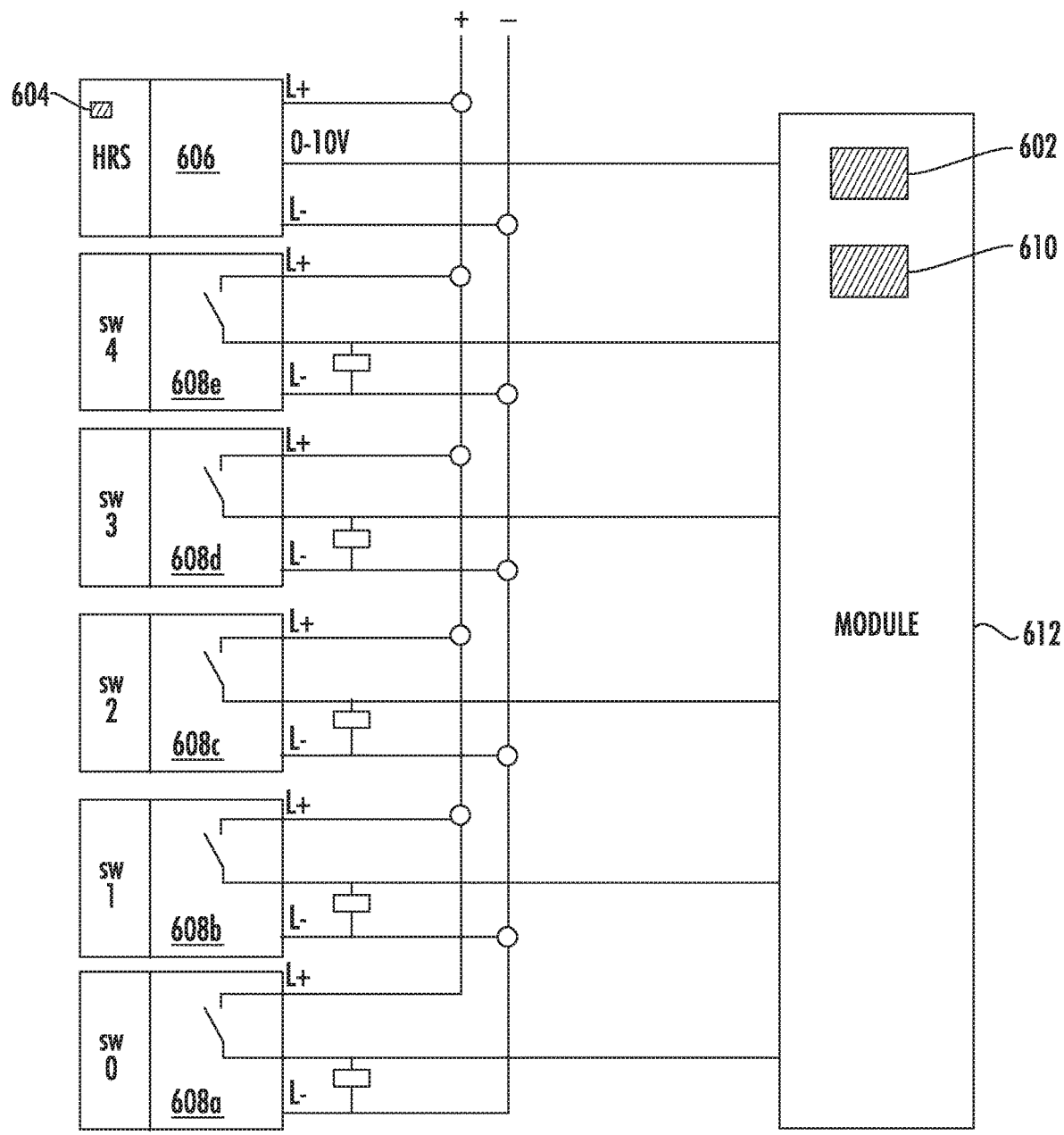
FIG. 6 is a circuit diagram of the monitoring system.

A monitoring circuit may couple to the high-resolution sensors and low-resolution sensors to generate a total displacement signal representative of the location of the telescoping beam section relative to the pivoting beam section. The embodiment of FIG. 5 removes the binary code (e.g., binary code 406). Grid 500 includes repeated target formations 502 and ranges 504, but omits the binary code shown in FIG. 4. Calculating the total extension follows a similar process. A high-resolution sensor 212 traverses each range 504 as the beam extends and the sensor 212 counts the number of ranges 504 over which it has traversed. Thus the total extension is the counted number of ranges 504 times the range 504 distance (e.g., the absolute distance) plus the measured distance to the nearest target formation 502 (e.g., the relative distance). In this way, grid formation 500 may use a smaller grid 500 that includes ranges 504 and target formations 502 by including a counter 604 disposed in high-resolution sensor 212 or sensory component 200. Referring to FIGS. 2 and 6, a high-resolution sensor 212 or a sensory component 200 may house the counter 604. Counter 604 may utilize a processor 602 on or distant from the high-resolution sensor 212 and/or the sensory component 200. In addition, the processor 602 may count and recall the number of ranges 504 and/or the number of extended beams to determine the total extension of the boom.

In some embodiments, counter 604 determines the number of extended ranges 504. The counter 604 increments (e.g., adds) ranges 504 as the beam extends from a known "zero" point location (e.g., retracted position). Counter 604 decrements (e.g., subtracts) ranges as the beam retracts from an extended location. By counting the number of target formations 502 associated with each range 504, the system operates functionally the same as described in reference to FIG. 4 above. Rather than encoding the absolute distance, the counter 604 records the number of extended ranges 504 and multiplies that number by the range 504 distance. In this way, the binary pattern 406 (e.g., as illustrated in FIG. 4) can be reduced to a series of repeated target formations 502 and ranges 504 on grid 500. The counter 604 replaces the binary pattern 406, and the high-resolution sensor 212 is the same as or similar to the sensor 212 previously described (e.g., sensor 212, and/or 300 as shown in FIGS. 1-3).

The processor 602 can calculate the total beam extension as a function of the number of target formations 502 multiplied by the range distance 504 (e.g., the absolute distance) plus the distance from the adjacent target formation 502 (e.g., the relative distance). The low-resolution sensor determines the absolute distance, and the high-resolution sensor (e.g., sensor 212 or 300) measures the relative distance. To calculate the total boom extension, the processor 602 computes the sum of the absolute distance, and the relative distance and multiplies the computed sum by the number of extended movable beams (e.g., 108 and 110). In some embodiments, the high-resolution sensor 212 and the counter 604 are housed together in a single component. The processor 602 may be housed with the high-resolution sensor 212, the counter 604, or separately at another location.

FIG. 6 illustrates one embodiment of these components. System 600 may include a processor 602, a counter 604, a high-resolution sensor 606, a series of binary, low-resolution switches 608a-e, memory 610 and/or a computing module. The processor 602 may compute the absolute distance from the number of ranges and the range distance. Processor 602 may add the computed absolute distance to the relative distance determined by high-resolution sensor 606.

The boom 112 may include a second telescoping beam 108 section which includes a second terminal end opposite the first end, the second telescoping boom section 112 telescopes relative to and along the longitudinal axis of the first beam 106 telescoping section. The processor 602 circuit can then determine the distance between the first beam 106 end and the second beam 108 terminal end based upon the displacement signal. Processor 602 can also multiply the sum of the relative and absolute distances by the number of beams in the boom. In this way, processor 602 can take the inputs of the counter 604 or the binary pattern 406 (e.g., shown in FIG. 4) with the high-resolution sensor and calculate the total boom extension based on the known number of beams in the boom.

The processor 602 may determines a maximum working extension of the telescoping beams on the boom. Processor 602 can provide a signal when the total extension approaches the maximum working extension of the boom. For example, processor 602 can signal the ignition of the telehandler to shut off when the total extension approaches, reaches, or exceeds the maximum working extension of the boom. Processor 602 may generate a signal (e.g., a warning light) that alerts the operator that the maximum working extension of the boom has been reached or exceeded. In some embodiments, a first signal (e.g., a yellow light) indicates that the operator is approaching the maximum working extension of the boom. A second signal (e.g., red light) indicates that the extension has been reached or exceeded. The processor may combine, or send multiple signals, to the operator, the ignition, one or more actuators, and/or other components of the telehandler.

The processor 602 described herein can be coordinated by operating system software, such as iOS, Android, Chrome OS, Windows 7, Windows 8, Windows Server, Windows CE, Unix, Linux, SunOS, Solaris, iOS, Blackberry OS, VxWorks, or other compatible operating systems. In other embodiments, a proprietary operating system may control the computing device. Conventional operating systems control and schedule computer processes for execution, perform memory management, provide file system, networking, I/O services, and provide a user interface functionality, such as a graphical user interface ("GUI"), among other things.

The processors 602 described herein may implement the techniques described herein using customized hard-wired logic, one or more Application Specific Integrated Circuits (ASIC) or Field Programmable Gate Arrays (FPGA), firmware and/or program logic which causes processors to be a special-purpose machine. According to one embodiment, the instructions for the techniques disclosed herein are stored in memory 610 and performed by one or more processors 602 in response to executing one or more sequences of instructions. Such instructions may be read into memory 610 from another storage medium, such as storage device. Execution of the sequences of instructions contained in memory 610 causes the processor 602 to perform the process steps described herein. In alternative embodiments, hard-wired circuitry may be used in place of, or in combination, with software instructions.

Moreover, the various illustrative logical blocks and modules described in connection with the embodiments disclosed herein can be implemented or performed by a machine. Examples include a processor device, a Digital Signal Processor (DSP), an ASIC, an FPGA or another programmable logic device, discrete gate or transistor logic, discrete hardware components, or any combination thereof designed to perform the functions described herein. A processor device can be a processor 602, but in the alternative, the processor device can be a controller, microcontroller, or state machine, combinations of the same, or the like. A processor device can include electrical circuitry configured to process computer-executable instructions. In another embodiment, a processor device includes an FPGA or another programmable device that performs logic operations without processing computer-executable instructions. A processor device can also be implemented as a combination of computing devices, e.g., a combination of a DSP and a processor 602, a plurality of processors 602, one or more processors 602 in conjunction with a DSP core, or any other such configuration. Although described herein primarily concerning digital technology, a processor 602 device may also include primarily analog components. For example, some or all of the rendering techniques described herein may be implemented in analog circuitry or mixed analog and digital circuitry.

As illustrated in FIG. 6, each binary switch 608a-e can relay information to the module 612 in a binary format, e.g., the switch is open, or the switch is closed. Five switches 608a-e encode five binary bits. Thus, switches 608a-e encode 32 ranges (2^=32). If each range has a total distance of 150 mm, and there are 32 ranges, five bits encode a total distance of 4.8 m. Similarly, other distances and ranges can be determined. For example, if six bits are used, 64 ranges are possible, and the total distance, using the same range, doubles (e.g., 9.6 m). In this way, binary pattern 406 can serve as a hard encoded memory for the absolute location of the boom. If the system 600 is shut down in mid-operation, the binary pattern 406 immediately senses the location of the extended boom.

A counter 604 in conjunction with the high-resolution sensor 606 may lose access to the number of extended ranges when power is interrupted (e.g., the key is turned off). To overcome this limitation, nonvolatile memory 610 may be used in module 612 to store the counted number of ranges. Nonvolatile memory 610 can store the counted number of ranges when the system 600 is powered off or during unexpected periods of interruption to the power. In this way, the counter 604 and nonvolatile memory 610 can replace the use of a binary pattern 406 with its accompanying switches 608a-e.

These program instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may include desktop computer systems, server computer systems, portable computer systems, handheld devices, networking devices or any other device or combination of devices that incorporate hard-wired and/or program logic to implement the techniques.

In some embodiments, ferrous paint can be used to create a grid along the beam. For example, superimposed layers of paint with embedded ferrous chips create ferrous target formations. In some embodiments, the metallic grid can include ferrous paint that creates a binary pattern with repeated ranges and target formations along the beam. In various embodiments, the painted grid pattern can be 1 mm, 2 mm, 3 mm, 4 mm, 5 mm, 6 mm, 7 mm, 8 mm, 9 mm, or 10 mm thick.

Figure 7:
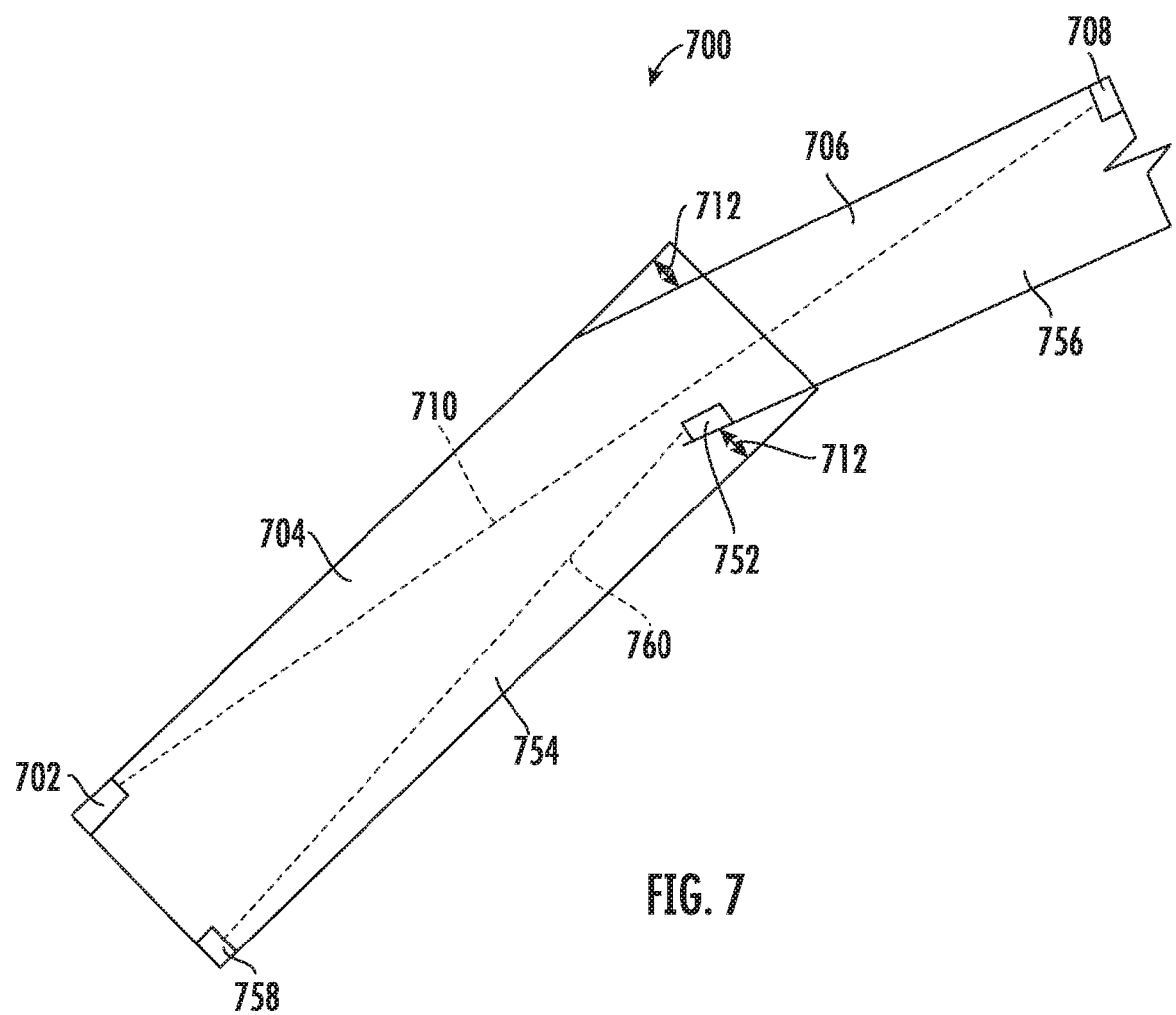
FIG. 7 illustrates a laser system to measure telehandler boom extension, according to one embodiment.

FIG. 7 illustrates a laser system to measure telehandler boom extension. As an alternative to the combination of sensors and structure discussed above, to measure the length of boom 700 as a result of retraction or extension, a laser 702 based measuring system could also be used. In particular, a laser circuit 702 would be used to directly measure the distance between the bottom of rotatable boom 704 and the top of movable boom 706. For example, a Leica DISTO E7100i laser circuit 702 could be mounted at the bottom of and inside of the boom 706 and aimed at a reflection plate 708 located at the tip of and inside of the boom 704. With this arrangement circuit 702 would generate a signal representative of the actual length of the boom 700 during operation, during or after a retraction, or during or after an extension. In is contemplated circuit 702 would have an operating distance of the length of a fully extended boom 700 with a relatively high accuracy. For example, the Leica DISTO E7100i laser circuit can measure distances up to 200' at an accuracy of ±1/16". In addition, it would be preferable for the circuit 702 to have the ability to communicate the length signal wirelessly using, for example, Bluetooth or Wi-Fi. The Leica DISTO E7100i laser includes a Bluetooth communication circuit which permits the wireless transmission of the length of the boom 700 as measured by circuit 702 mounted within the boom.

The use of circuit 702 as discussed directly above would be a desirable. In particular, the internal mounting of circuit 702 would protect the circuit 702 and reduce noise from spurious light. However, this arrangement requires that there be an unobstructed line of sight 710 for the laser circuit 702 from the bottom of the boom to the tip of the boom regardless of whether the boom is fully retracted, partially retracted or fully extended. For some booms, the structures required to be located within the boom 700 (e.g. hydraulic cylinders, hydraulic hoses, structural members, electrical wires) make an unobstructed line of sight from the bottom 702 to the tip of the boom 704 unavailable. Additionally, even if there is an unobstructed line of sight 710 within an unloaded boom, loading of the boom may cause a deflection 712 such that the line of sight 710 becomes blocked by boom 704 structure when the boom 704 flexes e.g. the arc of the boom 704 during loading is such that the laser no longer aligns with the reflection plate.

In view of the practical limitations imposed by a multi section extendible boom, circuit 702 may be attached between adjacent boom sections (e.g., 704 and 706) to generate a signal representative of the distance one boom section is extended from its fully retracted position relative to the adjacent boom section. For example, laser circuit 752 would be attached to the rotatable section 754 and interact with a reflection plate 758 on the adjacent boom section 756 to generate a signal representative of the extension distance. Assuming a typical hydraulic crane or lift boom where all of the boom sections of a boom 700 are extended in unison, the total length of an extended boom would be the retracted length of the boom in addition to the extension distance times the number of boom sections.

Figure 8:
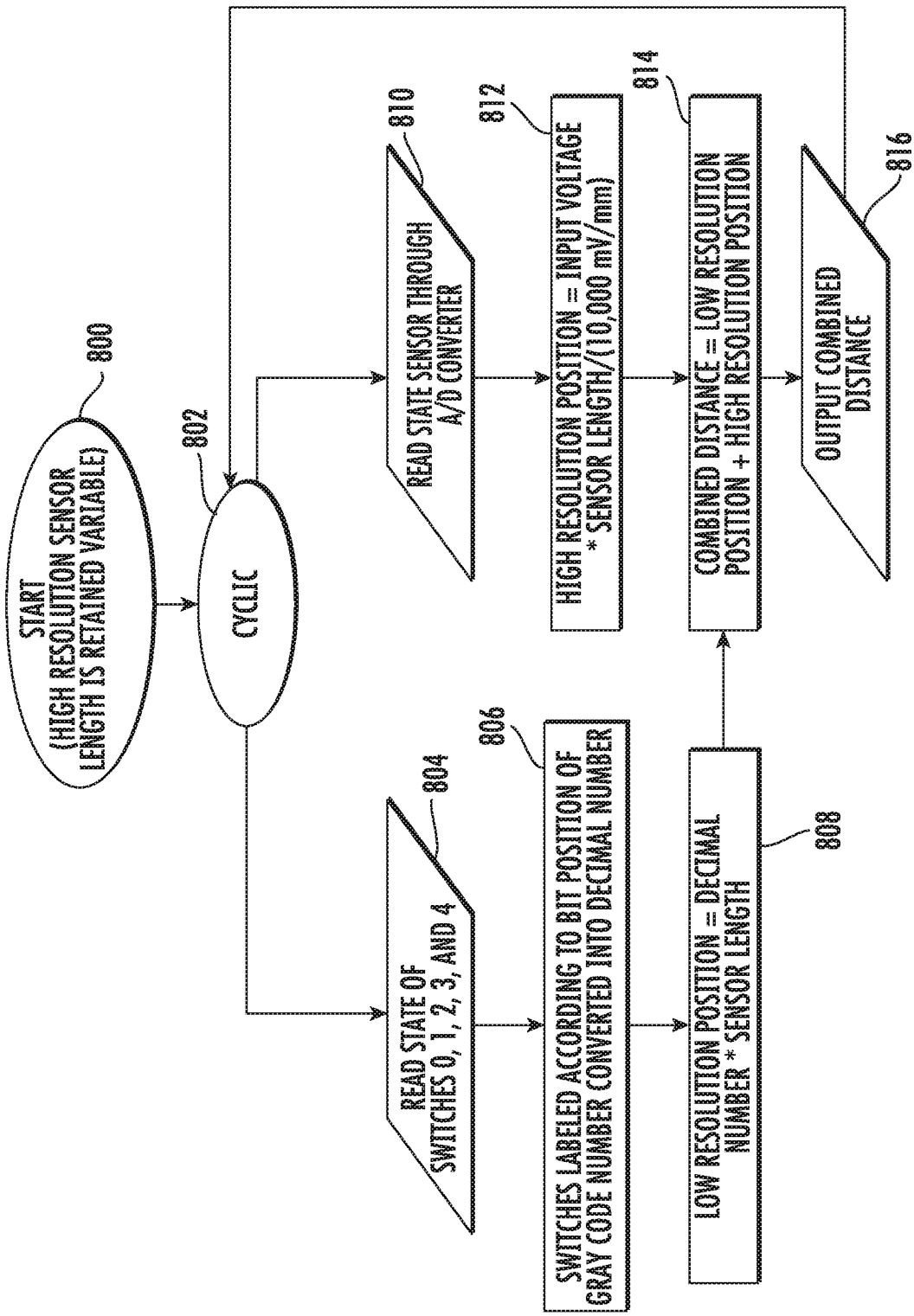
FIG. 8 is a method diagram of the monitoring system, according to one embodiment.

FIG. 8 illustrates a method 800 for determining boom extension. The method uses a high-resolution sensor with length as the retained variable. The method is cyclical and begins at step 802 for each range under observation. The left-hand column represents the process of determining the absolute location, and the right-hand column represents the method of obtaining the relative distance. The process begins with step 804 that reads the states of switches 0, 1, 2, 3, and 4 to determine the binary pattern and number of the extended location. In another embodiment, the counter would identify the number of ranges extended. The system converts the Gray code/binary number into a decimal number in step 806. The low-resolution position or absolute location is determined as the decimal number multiplied by the sensor length in step 808. On the right-hand column, the high-resolution sensor reads the location of the sensor relative to a target formation through an analog to digital converter in step 810. Step 812 determines the high-resolution position (aka relative location) as a product of the input voltage times the sensor length divided by the scale (here 10,000 mV/mm). Step 814 combines the distance to obtain a total extension as the sum of the low-resolution position (absolute location) and the high-resolution position (relative location). The output combined distance obtained in step 816 is repeated once the boom begins again to move and the process returns to step 802.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A boom extension monitoring system, comprising:
   a rotatable beam;
   a movable beam slidably supported to move along a longitudinal axis relative to the rotatable beam;
   actuator coupled between the rotatable beam and the movable beam;
   a metallic grid forming a sequence of equally-spaced formations, each formation spaced from an adjacent formation by a predetermined distance, the metallic grid including target formations that indicate the beginning and end of each range, the metallic grid pattern further comprising a binary number pattern;
   a low-resolution sensor that determines a number associated with the binary number pattern, the number indicating an absolute location of each range;
   a high-resolution sensor that determines the relative distance of the beam extension over the range as a distance from the adjacent target formation;
   wherein the extension of the movable beam is the sum of the absolute location plus the relative distance from the target formation.

2. The boom extension monitoring system of claim 1, further comprising a cut metallic grid that is welded to the movable beam or the stationary beam, the cut and welded metallic grid comprising the binary number pattern indicating to the low-resolution sensor the number of ranges extended.

3. The boom extension monitoring system of claim 1, wherein the high-resolution sensor has a range of 120 mm and receives a scaled voltage that determines a distance to a ferrous metallic target formation within the 120 mm range to an accuracy within ±0.1 mm.

4. The boom extension monitoring system of claim 1, wherein the metallic grid comprises a laser-cut 8 mm thick metallic target formation, wherein the high-resolution sensor uses a scaled voltage output from the metallic target formation to determine the distance from the target formation.

5. The boom extension monitoring system of claim 1, wherein the rotatable beam supports two movable beams, and the actuators extend each movable beam an equal distance, such that the total extension is two times the extension of the first movable beam.

6. The boom extension monitoring system of claim 1, further comprising a plurality of concentric movable beams, each of the plurality of concentric beams comprising an actuator to move the beam along the longitudinal axis relative to the rotatable beam, each of the plurality of concentric beams moving at an equal rate such that the extension obtained for a first beam is multiplied by the plurality of extended concentric beams to determine a total extension of the telehandler boom.

7. The boom extension monitoring system of claim 1, wherein the binary number pattern uses a Gray code to store the binary number, the Gray code encoding the absolute location for the number of extended ranges and wherein the extension of each range changes a single bit per extended range.

8. The boom extension monitoring system of claim 1, further comprising a processor that determines a maximum working extension of the boom and provides a signal when the total extension approaches the maximum working extension of the boom.

9. A boom extension monitoring system, comprising:
   a rotatable beam;
   a movable beam slidably supported to move relative to the rotatable beam, the movable beam divided into a series of equidistant ranges, each range comprising a target formation and a range distance;
   a grid formation forming target formations for each range, the grid formation being attached to the rotatable beam or movable beam;
   a counter configured to count a number of target formations during extension of the movable beam;
   a high resolution sensor configured to determine a distance from an adjacent target formation as the movable beam extends over the range;

non-volatile memory that stores the number of counted target formations and the range distance; and a processor that calculates a total beam extension, the total beam extension being a function of the number of target formations multiplied by the range distance plus the distance from the adjacent target formation, as measured by the high resolution sensor.

10. The boom extension monitoring system of claim 9, wherein the high-resolution sensor and the counter are housed together in a single component.

11. The boom extension monitoring system of claim 9, wherein the high-resolution sensor has a range of at least 10 cm and receives a scaled voltage that determines a distance to a ferrous metallic target formation within the 0 cm to at least 10 cm range with an accuracy of ±0.01 cm.

12. The boom extension monitoring system of claim 9, wherein the high-resolution sensor is selected from an eddy current inductive sensor, an LVDT voltage inductive sensor, a capacitive displacement sensor, a laser sensor, a confocal sensor, an acoustic sensor, and/or a magneto-inductive sensor.

13. The boom extension monitoring system of claim 9, further comprising additional beams, wherein extension of the first beam is equal to an extension of each additional beam, such that a total extension of the first beam is calculated and a total extension of the telehandler boom is calculated as a product of the total extension of the first beam multiplied by a total number of additional beams.

14. The boom extension monitoring system of claim 9, further comprising an embedded ferrous metallic paint grid formation that provides the grid formation and target formation locations for the high-resolution sensor.

15. The boom extension monitoring system of claim 9, wherein the grid formation is 3D printed onto the beam.

16. A boom extension monitoring system, comprising:
a rotatable beam;
a movable beam slidably supported to move along a longitudinal axis of the rotatable beam;
a ferrous paint formation on the rotatable beam or the movable beam, the ferrous paint formation forming a series of equally spaced ranges, each range comprising a target formation;
a counter that counts the number of target formations corresponding to each range during extension of the movable beam and computes an absolute location;
a high-resolution sensor that determines a relative distance from the adjacent target formation as the beam extends over each range;
a processor that determines the total beam extension as a function of the absolute location, as determined by the counter, plus the relative distance, as measured by the high-resolution sensor.

17. The boom extension monitoring system of claim 16, wherein the processor, the high-resolution sensor, and the counter are housed together in a single component.

18. The boom extension monitoring system of claim 16, wherein the ferrous paint formation includes an 8 mm thick target formation, and the sensor uses a scaled voltage output to determine the inductance as a scaled quantity representing the distance from each target formation.

19. The boom extension monitoring system of claim 16, wherein a plurality of beams are enveloped and each beam extends an equal distance relative to an adjacent beam, such that the system determines an extension of the first beam and multiplies the determined extension of the first beam by the number of enveloped beams to determine the total extension of the telehandler boom.

20. The boom extension monitoring system of claim 16, wherein the ferrous paint formation comprises a binary number pattern indicating an absolute location of each range as a multiple of the range distance and the binary number.

21. A boom length monitoring system for a telescoping boom having at least a pivoting beam section pivotable at a first end and a first telescoping beam section which telescopes relative to and along the longitudinal axis of the pivoting beam section, the telescoping beam including a first terminal end opposite the first end, the system comprising:
A metallic grid applied to one of the pivoting and telescoping beam sections, the grid including a plurality of unique, equally spaced formations and a pattern of spaced formations which identify the unique location of each equally spaced formation;
A low-resolution sensor array applied to the other of the pivoting and telescoping beam sections, the low-resolution sensor array interacting with the spaced formations to generate a first signal representative of each of the spaced formations;
A high-resolution sensor applied to the other of the pivoting and telescoping beam sections to generate a second signal representative of a location within a spaced formation; and
A monitoring circuit coupled to the sensors to generate a displacement signal representative of the location of the telescoping beam section relative to the pivoting beam section.

22. The system of claim 21, wherein the grid is a sheet of metal cut to form the formations, wherein the grid is fastened to one of the pivoting or telescoping beam sections.

23. The system of claim 22, wherein the edges of the formations include heat affected surfaces generated by a laser cutter.

24. The system of claim 21, wherein the metal grid is raised metal portions formed on the surface of one of the pivoting or telescoping beam sections.

25. The system of claim 21, wherein the circuit determines the distance between the first end and the terminal end based upon the displacement signal.

26. The system of claim 21, wherein the boom includes a second telescoping beam section which includes a second terminal end opposite the first end, the second telescoping beam section telescopes relative to and along the longitudinal axis of the first telescoping section, and the circuit determines the distance between the first end and the second terminal end based upon the displacement signal.

27. The system of claim 26, further comprises an actuating arrangement coupled to the pivoting beam section, and the first and second telescoping beam sections to uniformly extend the boom sections relative to each other.

* * * * *